(No Model.) 2 Sheets—Sheet 2.
E. W. BUELL.
DAMPENING MACHINE.
No. 600,191. Patented Mar. 8, 1898.
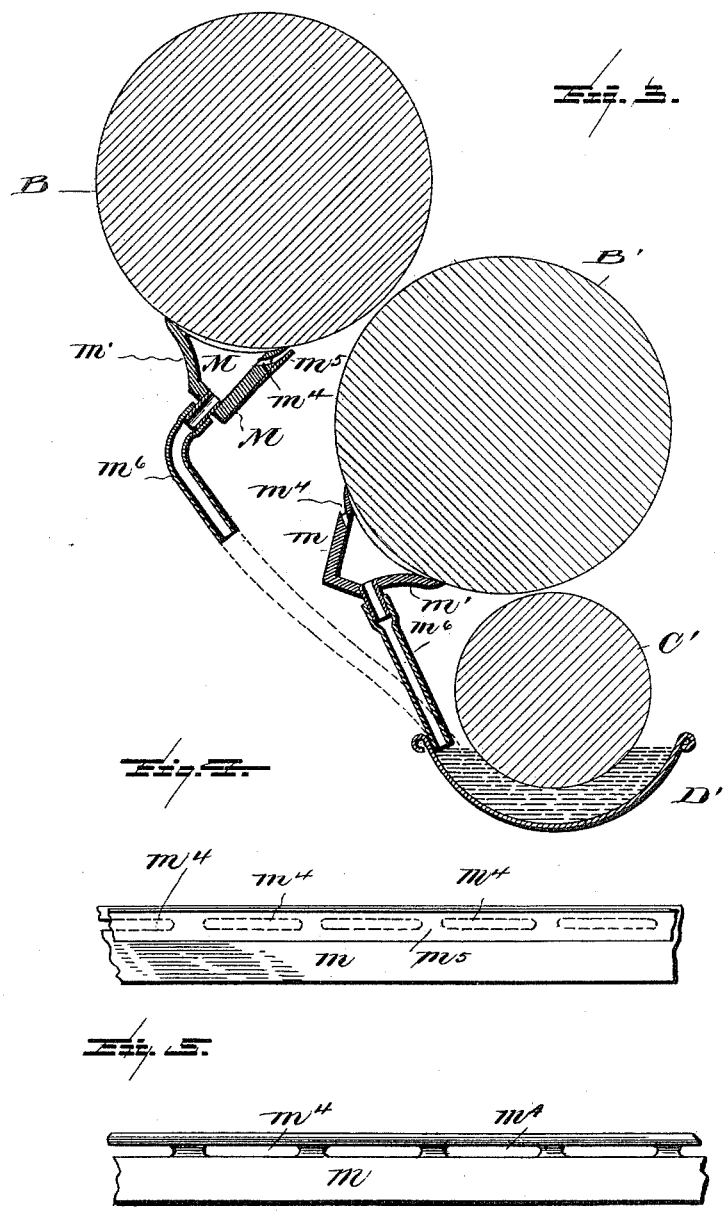
Witnesses
L. C. Hills.
Alfred T. Gage.
Inventor:
Edward W. Buell,
by E. B. Stocking
Attorney

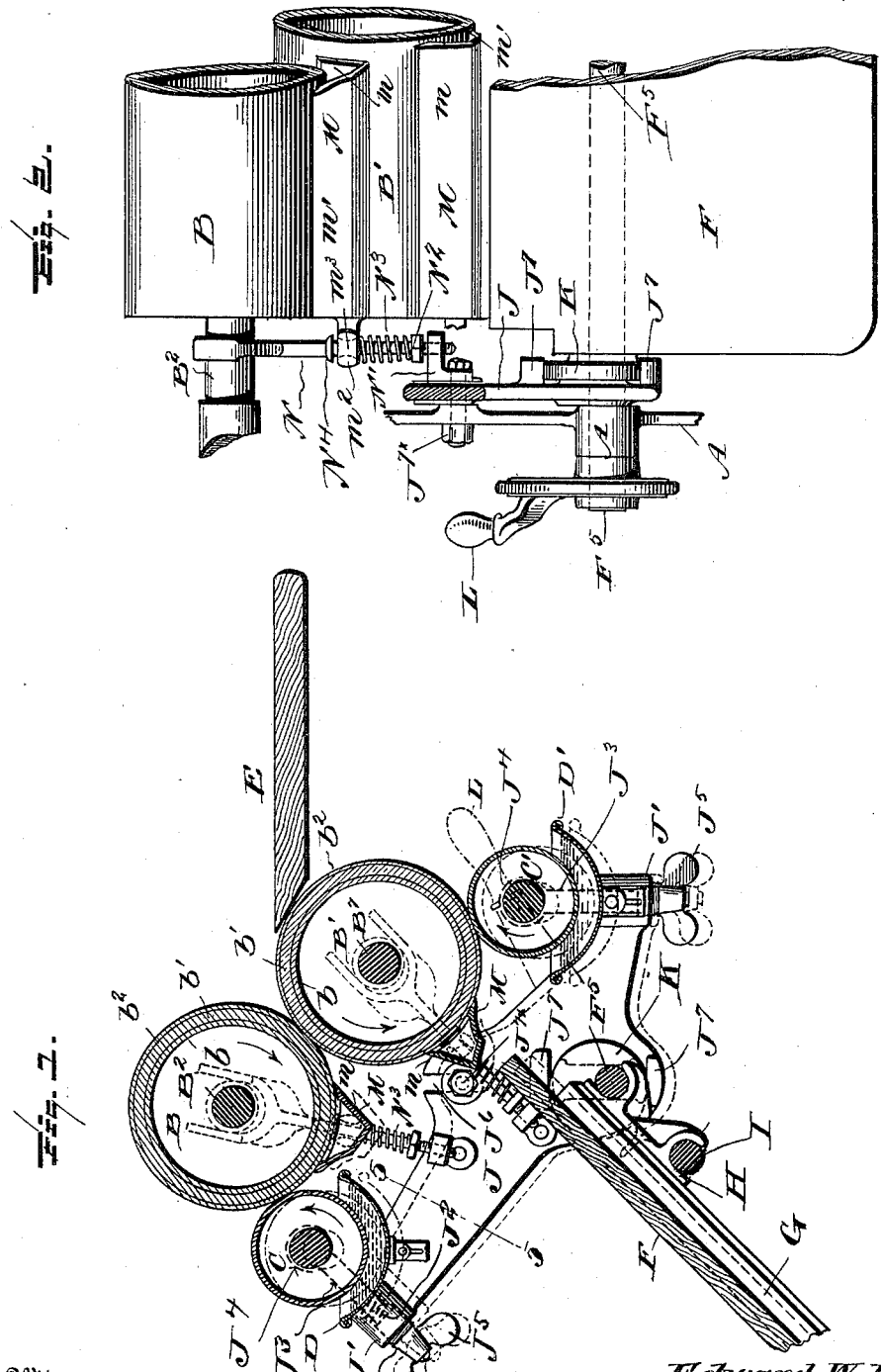

United States Patent Office.

EDWARD W. BUELL, OF CHICAGO, ILLINOIS, ASSIGNOR TO THE TROY LAUNDRY MACHINERY COMPANY, LIMITED, OF TROY, NEW YORK.

DAMPENING-MACHINE.

SPECIFICATION forming part of Letters Patent No. 600,191, dated March 8, 1898.

Application filed May 13, 1897. Serial No. 636,311. (No model.)

*To all whom it may concern:*

Be it known that I, EDWARD W. BUELL, a citizen of the United States, residing at Chicago, in the county of Cook, State of Illinois, have invented certain new and useful Improvements in Dampening-Machines, of which the following is a specification, reference being had therein to the accompanying drawings.

The invention has relation to a dampening-machine suitable for dampening goods and articles in the process of laundering the same after they have been starched.

The invention is an improvement in that which is disclosed in the United States Patent No. 401,770, granted April 23, 1889, to M. E. Wendell and T. S. Wiles; and it has in view, among other objects, the adaptation of the invention to a use upon comparatively heavier lines of goods and articles, to provide means for preventing the adhesion of goods or articles to the dampening-rollers, and to provide means for controlling the operation of the devices employed to prevent such adhesion, also to prevent the application of water to the article after it is dampened and during its passage from the dampening-rollers.

The construction and arrangement of the dampening and water-supply rollers of the machine are substantially the same as in the prior patent above mentioned.

As this machine is intended for dampening starched goods, it seems to be proper to state that the liability to dislodge or remove the starch from the goods in an application of water for dampening the same renders it essential to maintain a perfect control of the amount of water which shall be taken up by the dampening-rollers and the amount which shall be delivered therefrom to the goods or articles being dampened thereby. Now while dampening shirts and other goods and articles which are comparatively heavier than collars and cuffs and which require a larger quantity of water to be absorbed by the dampening-rollers the same conditions of control of the quantity of water exists as in dampening collars and cuffs, so as to prevent displacement or removal of the starch, whereby when ironed a defective finish would result. Again, difficulties occur in dampening shirts and other large goods or articles which are not present in operating upon smaller articles, like collars or cuffs, in that in such former articles there are portions which are thinner than others and therefore are liable to adhere to the rollers after passing between the same and to become wound upon one or the other of the rollers, rendering it necessary to stop the machine to disengage the article from the rollers. Another difficulty to be overcome is that there is a liability of water dropping from the dampening-rollers upon an article after it has passed between said rollers, and this is also to be prevented.

Other objects and advantages of the invention will appear in the following description, and the novel features thereof will be particularly pointed out in the claims.

Referring to the drawings, Figure 1 is a substantially central vertical section of the principal elements of a machine embodying my invention. Fig. 2 is a rear elevation of the principal portions shown in Fig. 1. Fig. 3 is a diagrammatic illustration of the relative arrangement of the water-receiving doffers and their connection with the trough. Fig. 4 is a front view of the active face of the doffer employed in connection with the upper dampening-roller, and Fig. 5 is a similar view of a like portion of a doffer employed in connection with the lower dampening-roller.

Like letters refer to like parts in all the figures of the drawings.

A represents any suitable framework for supporting the movable and fixed portions of the machine.

B and B' represent the dampening-rollers, which consist of a body or shell $b$, a rubber periphery $b'$, and an absorbent covering $b^2$. The rubber periphery serves as an elastic non-absorbent body or periphery of the dampening-rollers, which permits the passage of protuberances—such as buttons, seams, and other inequalities of thickness—and by their embedment in said elastic element insures uniformity of dampening at and about the same with that produced at other portions of the article. The covering $b^2$ may consist of any suitable number of layers of cotton cloth or of any suitable thickness of any absorbent material whether applied in one or in more than one layer. The requisite characteristic of the absorbent covering is that it shall be limited in its absorbent capacity, so that it shall not take up more water than can be controlled by a proper adjustment of the dampening-rollers against the goods being dampened or against each other. As thus described the dampening-rollers B and B' do not materially differ from those disclosed in the prior patent above mentioned; but as in dampening shirts and other large articles the said rollers are adjusted with a pressure sufficient to produce a trough of water at, along, and above their line of contact it is possible by the use of the rollers without any absorbent covering to produce such a body of water at that place. The invention is not necessarily limited in this regard to the use of the particular dampening-rollers thus far described.

C and C' represent the water-supply rollers of the machine, and D and D' represent the water troughs or tanks employed in connection with said rollers. The water-rollers C and C' may be of any suitable and usual construction, but are preferably formed of a non-corrosive material, such as brass, and may be either plain or corrugated on their peripheries, as is customary, to facilitate the carriage of the water from the troughs to the dampening-rollers by the rotation of the water-rollers when partly submerged. Any suitable gearing may be employed to rotate the several rollers in the direction indicated by arrows, and any suitable adjusting means for regulating the distance between or contact-pressure of the dampening-rollers B and B' may be employed—for example, such as is shown in the said before-mentioned patent.

E represents a table for the support of goods, and below the contact-line of the dampening-rollers there is a delivery-shelf F, to which or to a cleat G thereon is secured a casting H, which is one of a pair employed for maintaining the delivery-shelf in position by embracing a tie-rod I and a shaft $F^5$, as shown. A duplicate casting is employed at the opposite end of the shelf, whereby it is supported.

J represents a yoke, of which there are two, one at each side of the machine. At the extreme ends of the yoke there are formed boxes J', which are hollow, as shown at the left of Fig. 1, and contain a spring $J^2$, encircling a rod $J^3$, at the top of which is formed a bearing $J^4$ for the shaft of a water-supply roller. An adjusting-nut $J^5$ serves to press the water-supply roller against the adjacent dampening-roller. All of the bearings of the water-supply rollers are similarly constructed. Going now to the central portion of each yoke J, it will be observed that its upper edge is slotted, as at $J^6$. Reciprocations are produced by means of projecting lugs $J^7$, formed on each yoke, between which an eccentric K operates, said eccentric being operatively mounted upon the shaft $F^5$, upon which is also mounted a lever L, whereby the eccentric may be rotated to raise and lower the yoke. The yoke is maintained in a vertical plane by being slotted to embrace the shaft $F^5$, mounted in the main frame of the machine, said yoke lying between the eccentric and the frame of the machine and guided by a guide bolt or lug $J^{7\times}$, seated in the frame.

It is of course understood that the dampening-rollers are mounted in the frame A, while the water-supply rollers, troughs, and doffers are mounted in the yokes J.

It now remains to describe the means for preventing the adherence of the dampened goods or articles to the dampening-rollers.

M represents a doffer which is applied to each of the dampening-rollers at a point below their line of contact with each other. Each of the doffers consists principally of a blade $m$, presented to the periphery of the roll angularly, as shown, so as to act to strip from the roll an approaching edge of an adhering article and to direct an advancing portion of an article which adheres to the roll at any rearward point, so that in either case the article shall be directed upon the delivery-shelf F under all conditions when it does not naturally arrive at that point. In addition to the blade $m$ the doffer comprises an opposing wall $m'$, the upper edge of which is also intended to contact with the roll, thereby preventing a too positive contact of the blade portion $m$. The two walls converge and join each other, as shown. At each end of the doffer there is provided a bearing $m^2$, by which the doffer is supported in operative position upon a rod N, which is bifurcated to rest upon the shafts $B^2$ and $B^7$, respectively, of the two dampening-rollers. The opposite end of the rod N is supported by the yoke J in any desired manner. In this instance a bracket N' is secured to the yoke, and the rod N is seated in said bracket, in this instance by screw-threading. A nut $N^2$ is threaded on the rod, and a coiled spring $N^3$ encircles the rod between the nut and the bearing $m^2$. A collar or shoulder $N^4$ is formed on the rod above the bearings. The bearings $m^2$ are made tapering inwardly from both sides, as at $m^3$, for the purpose of enabling the doffer to seat itself properly against the dampening-roller and to give the desired looseness of fitting upon the rod N, whereby the doffer may tilt in either direction across the rod. The contact of the coiled spring, while it serves to press the doffer yieldingly against the dampening-roller, also permits of said tilting movement thereof.

In dampening any class of goods wherein a comparatively large quantity of water or moisture is employed and where such goods are liable to adhere to the dampening-rollers the doffers thus far described are adapted and competent to perform the desired function of preventing such adherence; but where, as in the case of heavier goods, a larger quantity of water or moisture is employed the doffers, while they separate the goods from the rollers, also tend to collect water or moisture from the rotating dampening-rollers and to direct said water upon the goods which are passed between the rollers, thus deteriorating the uniformity of the dampness in the goods. To obviate this difficulty and to adapt the one machine for use upon both classes of goods, I provide means whereby the collection and transfer of water from the rollers to the goods by the doffers are prevented. In Figs. 3, 4, and 5 one form of construction for that purpose is illustrated.

The front wall $m$ of each of the doffers is provided with a water-receiving passage $m^4$. This front wall or blade portion $m$, which acts to gather the water, will, when applied to the lower dampening-roller B', naturally receive and conduct the water through the passage or passages $m^4$ into the interior of the doffer; but the blade portion of the doffer applied to the upper roller B requires the provision of an upward extension $m^5$ of the lower wall of the water-passage $m^4$ in order to catch the water directed from the upper roll by the edge of the doffer and to guide the water into said passage. As the water is collected within the doffer it may be conveyed therefrom to any suitable point by the pipe $m^6$, which, if desired, may be flexible and deliver the water into the lower trough D' of the machine, as shown by dotted extension in Fig. 3.

In bringing the parts of the machine into motion the lever L has been thrown from a substantially vertical position to that shown in Figs. 1 and 2—that is, inclined to the front. Goods are fed from the table E between the rollers. The water-supply rollers carry the water upwardly until it comes into contact with the dampening-rollers, and if the contact-pressure of the water-supply rollers is slight the absorbent coverings of the dampening-rollers take up the water to their fullest capacity; but if said contact be firm the capacity to absorb is limited in proportion to said pressure, so that a less quantity of water is carried up by each covering above the point of contact of the water-supply rollers therewith. This variable pressure of the water-supply rollers against the dampening-rollers is regulated through the medium of a single device—the lever L. The farther the lever is depressed from a vertical position the greater the pressure of the water-rollers. The same manipulation of the lever serves to lift the doffer-blades into contact with the dampening-rollers, and by bringing the lever to a vertical position the water-supply rollers may be entirely separated from the dampening-rollers and the doffers also separated therefrom—as, for example, when the machine is idle. So, also, by a lesser movement of the lever L and by a proper adjustment of the springs $N^3$ on the doffer-rod the water-supply rollers may be separated from, while the doffers remain in working contact with, the dampening-rollers—as, for example, when said rollers are sufficiently supplied with moisture for successive operations on a limited quantity of goods.

It is apparent that the details of the connecting and supporting devices may be varied in numerous particulars of construction and arrangement and yet serve the purpose of their use. The invention is therefore not limited in this regard, but may be altered in construction and arrangement to any degree within the scope of mechanical skill without departing from the spirit of the invention.

What I claim is—

1. The combination of a dampening-roller and a tiltably-mounted doffer constructed to contact with said roller at two points, substantially as specified.

2. The combination of a dampening-roller and a tiltably and yieldingly mounted doffer constructed to contact with said roller at two points, substantially as specified.

3. The combination of a dampening-roller and a reciprocatively-supported doffer, substantially as specified.

4. The combination with a dampening-roller, of a doffer tiltingly, yieldingly and reciprocatively supported, substantially as specified.

5. The combination of a dampening-roller, a doffer, and reciprocative means for forcing the doffer yieldingly against said roller and for separating the doffer from said roller, substantially as specified.

6. A doffer having a blade portion and a parallel portion for contact purposes and a bearing which permits a tilting movement of the doffer, substantially as specified.

7. A doffer having water-passages therein, substantially as specified.

8. A doffer having water-passages in the blade portion thereof, substantially as specified.

9. A doffer having water-passages therein and a water-directing extension, substantially as specified.

10. A hollow doffer having means for the collection and the discharge of water, substantially as specified.

11. A tiltably-mounted doffer having means for the collection and discharge of water and flexible means for receiving and conveying water from the doffer, substantially as specified.

12. The combination with the dampening-rollers, of water-supply rollers and a doffer mounted in yokes, and means for bodily raising and lowering said yokes, substantially as specified.

13. The combination of dampening-rollers, doffers, and yokes, and means for raising and lowering said yokes, substantially as specified.

14. The combination with dampening-rollers, of water-supply rollers and doffers, and of means for simultaneously separating the water-supply rollers and doffers from the dampening-rollers, substantially as specified.

15. The combination with a dampening-roller, of a doffer, a rod for supporting the doffer, said rod being slidably supported at one end and secured to a movable part at its other end, and means for raising and lowering said movable part, substantially as specified.

16. The combination with a dampening-roller, of a doffer, a rod for supporting said doffer, a coiled spring encircling said rod, a bearing on the doffer through which said rod passes, a collar on said rod above said bearing and means for reciprocating said rod, substantially as specified.

17. In a dampening-machine, doffers supported by a yoke, and an eccentric operatively connected with the yoke for raising and lowering the same, substantially as specified.

18. In a dampening-machine, a yoke, water-supply rollers, and doffers mounted thereon, said yoke being slotted and provided with projections at the ends of the slot, in combination with a shaft passing through said slot and provided with an operating-lever, and an eccentric rigidly mounted upon the shaft between said projections, substantially as specified.

19. In a dampening-machine, a doffer, a rod carrying and supported to reciprocate said doffer in its relation to the dampening-roller, and means to produce the reciprocation of said rod, substantially as specified.

20. In a dampening-machine, a doffer, a rod carrying and supported to reciprocate said doffer in its relation to the dampening-roller, means to produce the reciprocation of said rod, and a coil-spring encircling said rod and yieldingly supporting said doffer, substantially as specified.

21. In a dampening-machine, a doffer, a rod carrying and supported to reciprocate said doffer in its relation to the dampening-roller, means to produce the reciprocation of said rod, a spring for supporting said doffer, and an adjusting-nut for said spring, substantially as specified.

22. In a dampening-machine, a doffer, a supporting-rod for said doffer bifurcated at its upper end and passing upon opposite sides of a guide, a reciprocating yoke by which said rod is carried, and means for reciprocating said yoke, substantially as specified.

23. In a dampening-machine, a doffer, a supporting-rod for said doffer bifurcated at its upper end and passing upon opposite sides of a guide, a reciprocating yoke by which said rod is carried, means for reciprocating said yoke, and an operating-lever for actuating said reciprocating means, substantially as specified.

24. In a dampening-machine, a reciprocating yoke, a doffer carried thereby, projecting lugs on said yoke, an eccentric located between said lugs, and means for rotating said eccentric to reciprocate the yoke, substantially as specified.

25. In a dampening-machine, the combination with the dampening-rollers, of a reciprocating yoke carrying at opposite ends water-supply rollers, doffers located upon said yoke intermediate of said water-supply rollers, means to reciprocate the yoke to move said water-supply rollers and doffers to and from the dampening-rollers, and water-troughs carried by said yoke beneath the water-supply rollers, substantially as specified.

26. In a dampening-machine, the combination with dampening-rollers, of a reciprocating yoke carrying at opposite ends water-supply rollers, doffers located upon said yoke intermediate of said water-supply rollers, and means for reciprocating the yoke to move said water-supply rollers and doffers to and from the dampening-rollers, substantially as specified.

27. In a dampening-machine, the combination with a dampening-roller and a water-supply roller, of a doffer in contact with said dampening-roller, a trough beneath said water-supply roller, and means for conveying the water collected by said doffer to the trough, substantially as specified.

28. In a dampening-machine, the combination with a dampening-roller and a water-supply roller, of a doffer provided with a trough, a trough beneath said water-supply roller, and a flexible connection between said doffer and the trough beneath said water-supply roller, substantially as specified.

29. The combination with a dampening-roller, of a doffer, a rod for supporting said doffer, a coil-spring encircling said rod and yieldingly supporting said doffer, and a bearing of the doffer through which said rod passes, the inner face of said bearing being inclined in its relation to the rod so as to permit a tilting of the doffer, substantially as specified.

In testimony whereof I affix my signature in presence of two witnesses.

EDWARD W. BUELL.

Witnesses:
ALLEN CONKLING,
GEORGE A. WEBNER.